United States Patent [19]

Barry et al.

[11] Patent Number: 5,563,806
[45] Date of Patent: Oct. 8, 1996

[54] ADAPTIVE PARAMETRIC DATA CHANNELIZER FOR ACQUIRING AND TRACKING DISCRETE INTERLEAVED SIGNALS

[75] Inventors: Brian M. Barry, Kanata; John R. Altoft, Orleans; James F. Mickeal, Ottawa; Gordon MacKean, Kanata; Robert J. Inkol, Orleans, all of Canada

[73] Assignee: Her Majesty the Queen in right of Canada, as represented by the Minister of National Defence, Ottawa, Canada

[21] Appl. No.: 300,516

[22] Filed: Sep. 6, 1994

[30] Foreign Application Priority Data

Sep. 27, 1993 [CA] Canada .................................... 2107068

[51] Int. Cl.$^6$ ...................................................... G06F 17/00
[52] U.S. Cl. .................................................................. 364/516
[58] Field of Search ................................ 364/516, 514 R, 364/517; 340/146.2; 342/195, 194, 107, 108, 159, 160, 162

[56] References Cited

U.S. PATENT DOCUMENTS

| | | | |
|---|---|---|---|
| 4,748,438 | 5/1988 | Mickeal | 340/146.2 |
| 4,859,985 | 8/1989 | Inkol | 340/146.2 |
| 4,879,561 | 11/1989 | Inkol | 342/195 |
| 5,258,924 | 11/1993 | Call et al. | 364/516 |
| 5,332,176 | 7/1994 | Wooton et al. | 364/516 |
| 5,390,133 | 2/1995 | Sohie | 364/516 |
| 5,402,130 | 3/1995 | Sherman | 342/152 |
| 5,414,643 | 5/1995 | Blackman et al. | 364/516 |
| 5,422,830 | 6/1995 | Post | 364/516 |

OTHER PUBLICATIONS

Hanna, Craig A.; "The Associative Comparator: Adds New Capabilities to ESM Signal Processing", Feb. 1994, pp. 51–62, Defense Electronics.

Benton, R. D. et al; "A State–Of–The–Art Radar Pulse Deinterleaver", Sep. 19–21, 1988; pp. 145–152; User Group Technical Meeting, Southampton, U.K.

Inkol, et al; "An Advanced Pre–Processor For Deinterleaving Pulse Date", Nov. 1990, pp. 485 to 488; Proceedings of Government Conf. on Micro–electronics and Circuits, Las Vegas, Nevada.

Primary Examiner—Ellis B. Ramirez
Attorney, Agent, or Firm—Larson and Taylor

[57] ABSTRACT

A passive electronic warfare system must deinterleave trains of pulses from a number of radar transmitters. An adaptive parametric channelizer for acquiring and tracking trains of pulses consists of an input channelizer operating under the control of a resource control processor. Each pulse descriptor word (PDW), a set of digitized signal parameters measured by a specialized receiver of radar pulse signals, is temporarily stored in a first-in-first out (FIFO) buffer memory. PDW data from the FIFO buffer memory is then applied to a set of parameter filter devices. These filters are provided with a range of parameter values, forming windows, by the resource control processor. The filters operate such that when a PDW falls within one of the filter's windows, a match output is asserted and applied to a match list generator which maps asserted matches into a list of filter index numbers. That list is applied to a mapper which transforms filter indices into track buffer indices in order to store a PDW that matches one filter into an associated track buffer of a set of track buffers. The combination of at least one parameter filter linked by the mapper with a track buffer form a track channel. The match list generator supplies data and event interrupts to the resource control processor which causes the parameter window of any track channel to be modified and force track channels to be merged.

17 Claims, 4 Drawing Sheets

ADAPTIVE PARAMETRIC DATA CHANNELIZER FOR ACQUIRING AND TRACKING DISCRETE INTERLEAVED SIGNALS

FIELD OF THE INVENTION

The present invention relates to an adaptive parametric channelizer for sensor applications and in particular to a radar electronic support measures (RESM) system. Within such systems, sensors measure the parameters of signals corresponding to each of a multiplicity of radar transmitters. The channelizer deinterleaves this data and stores it in a memory organized to allow data corresponding to any one or a small group of radar emitters to be easily accessed for further analysis.

BACKGROUND OF THE INVENTION

In general, sensors typically receive signal data and measure some set of signal parameters using appropriate signal measurement techniques. A channelization tracking system is usually included which groups signal data with similar parameters and provides some indication of parameter changes over time. The system will attempt to infer other attributes based on the grouped parameter data which can be used to classify and identify that signal source. Nearly all sensors employ fairly standard signal processing algorithms for parameter measurement and tracking functions which may be implemented with either digital or analog devices, or a combination of both. Heuristic pattern matching techniques are typically used for classification and identification. These may also be used to perform tracking and pre-processing functions when there is insufficient data for classical methods such as Kalman filters to be effective. While these devices were designed with a particular type of sensor in mind, i.e. a radar ESM system, they will also be applicable to a broad range of sensor applications with minor modifications. The particular systems described in the present application utilize sensors which passively intercept and analyze pulsed radio frequency (RF) signals in the microwave bands.

The receivers in radar electronic support measures (RESM) systems can generate considerable quantities of data in dense electromagnetic signal environments with this data being generally digitized and formatted into pulse descriptor words (PDWs). These PDWs include parameters such as "time-of-arrival" (TOA), "pulse amplitude", "radio frequency" (RF), "angle-of-arrival" (AOA), and "pulse width". The time history of the data corresponding to a discrete emitter can be processed to yield additional information such as the "pulse repetition interval" (PRI) and the "scan type" and "period" of the transmitting antenna. These signal parameters can then be compared to values stored in libraries in order to identify the emitters of those signals.

The processing of all this raw RESM data is complicated since the PDW time histories of a number of emitters is interleaved. It is therefore desirable to perform a form of coarse deinterleaving of the raw data using information such as frequency, angle-of-arrival and pulse width. Ideally, using this information, pulse data from most emitters can be separated based on the uniqueness of clusters in these dimensions. High peak data rates are possible which will result in a requirement for the use of very high speed hardware in order to filter the data. The use of highly parallel programmable multi-processor architectures has been proposed. However, the relatively simple and repetitive nature of the filtering algorithm favours the use of specialized high speed hardware which can minimize the time overheads associated with the control and intercommunication functions.

The PDW data is generally transferred over a specialized signal data bus to a pre-processor. In these systems, the function of the pre-processor which follows the receiver unit is to deinterleave the PDWs into one or more separate emitter tracks or pulse trains. This is essentially a correlation or sorting process, often involving two stages. In the first stage, data is selectively captured and stored based on programmable parameter filters. These parameter filters are programmed with parameter ranges or windows corresponding to emitters which were previously detected and classified. PDWs whose parameter fields fall within the ranges which have been set for a particular filter are captured by that filter. This stage of the pre-processor is usually implemented with digital hardware in order to keep up with the high data rate of the incoming PDWs. The second stage, which may also be implemented in hardware but is more often a software process, involves more fine-grained analysis of samples of the incoming data. In this second stage, any data collected from existing filters is analyzed to verify that the signal parameters associated with an emitter track have not changed significantly. If a significant change is observed, the parameter ranges associated with the corresponding parameter filters are adjusted to track the change. Data which is not captured by any of the existing parameter filters is sampled and analyzed in the second stage to determine how many new emitters are represented in the sample, i.e. emitters for which no corresponding parameter window previously existed. This data is then grouped and sorted into buffers corresponding to new emitter tracks.

The main functions of the pre-processor are therefore to:

(a) selectively capture and sort data from existing tracks;

(b) acquire new signals as they enter the environment;

(c) monitor existing signals for any parameter changes; and (d) reduce the flow of data to subsequent processing stages.

Any ESM system which performs emitter tracking must have a subsystem which keep parameter filters approximately centred on the parameters of the incoming PDW data. Furthermore, any PDW data which is designated by the pre-processor as a new emitter track must be analyzed and classified. This function may be implemented within the tracking subsystem or may be done by a separate classification and identification module. The classification process is aimed at characterizing the behaviour over time of the pulse train as a whole, as opposed to the pre-processor which considers only single pulses. Pulse train characteristics which are measured in this classification process include items such as the structure of the pulse repetition intervals (PRIs), the pattern of any radio frequency agility and the emitter's scan pattern.

An acquisition subsystem sets up new parameter filters for new signal sources. These filters will intercept any further incoming data that should be associated with a new track. New tracks may be identified with one or more generic emitter types by matching their classification with an emitter database containing characteristic parameters for a large number of known emitters. Emitter tracking and classification as well as identification subsystems are both usually implemented as software processes.

New emitter tracks and updates of old tracks are passed on for higher level processing. This will usually involve maintaining a list of currently active emitters in the environment, at a minimum, and forwarding this information to an ESM operator display or a higher level Command and Control System. Other functions may be included such as platform-to-emitter correlation, displays showing emitter/platform bearing and motion, interactive programs which allow an operator to perform additional data analysis and so forth. In addition, there are generally a number of system control functions implemented at this level, mainly to provide interfaces between the lower levels of ESM processing, the ESM operator and the Command and Control System.

A parametric tracker is a type of pre-processor which also includes, as an integral component, a tracking subsystem that keep parameter filters centred on the incoming PDWs data in addition to performing functions (a) to (d).

Inputs to a parametric tracking subsystem are a time ordered stream of PDWs from an ESM receiver. Each PDW is the result of an associated sensor measurement for an individual pulse and consists of an ordered set of digitized parameter measurements. There can also be a number of discrete fields which describe other attributes of the signal such as the stability of a parameter during the transmission duration. Measured parameter values associated with successive emissions from any one signal source may vary due to small errors introduced by environmental noise, variations in the equipment or the propagation environment. This variability of parameter values complicates the operation of a tracker and can degrade its performance.

The environment in which signal sources reside may be considered as a multi-dimensional parameter space in which clusters of measured parameter values represent the signal sources. A cluster would then be a particular grouping of PDWs in the dimensions of interest based on some nearness criterion. The parametric tracker task may then be described as collecting and processing data from these clusters of signal data for as long as their sources persist in the environment. However, clusters in one or more dimensions may change in size or may translate as a function of time. Variations in the physics of the situation can result in slow changes in a parameter value and it is desirable to track these changes in parameter space. This will not only permit continued collection of data from an associated signal source but will also avoid misinterpreting that data as being from a number of different sources appearing sequentially in time. Clusters may also move in such a manner as to collide and overlap with other clusters. In that case, the data collection process may have to be altered to collect data from a larger cluster encompassing those clusters involved in the collision.

An ideal parametric tracker should maintain a set of discrete track channels, each of which maintains a window in a parameter space that can be tuned and adjusted to track a particular signal cluster. That portion of a parameter space which is of interest to the tracker is called a viewport. The functions of an ideal parametric tracker are:

(a) signal acquisition - the formation of a new track channel which will be used to capture subsequent parameter measurements from any new signal source which falls within the viewport;

(b) data collection - a facility to collect data which is associated with each track channel in time order;

(c) collision detection - a capability to detect when clusters being tracked overlap so that the track channels associated with these overlapping clusters can be merged;

(d) adaptability - capabilities to modify the parameter window of each track channel, split a track channel so that data collection can occur independently through two separate parameter windows, force track channels to merge and remove track channels; and (e) automatic tracking - a capability to adjust the tracking window without external direction to follow the cluster of signal data in one or more dimensions. This feature may be optional depending on the variability of the received data.

In prior art parametric trackers, measured signal data in the form of PDWs are applied to an input first-in-first-out (FIFO) buffer. As each PDW is obtained from the FIFO buffer, the parameters of interest are extracted and tested against a set of corresponding minimum and maximum limits in each tracking filter. For filters which detect a match, the entire PDW is stored in corresponding data buffers or, alternatively, stored in a single large buffer using linked list techniques. The tracking filter plus the buffer constitute one track channel.

If no filter claims a PDW, it is applied to an acquisition filter. If the parameters of interest for this PDW fall within its viewport limits, i.e. the limits of the portion of parameter space being intercepted by this parametric tracker, it is stored in an acquisition buffer. The data collected in this buffer is then analyzed by a clustering algorithm to estimate the dimensions of one or more clusters that contain the data. Each cluster is formed using a nearness criterion where a data point is said to belong to a cluster if it is within a pre-set minimum distance in each parameter dimension from a predetermined point. Tracking filters are tuned and enabled on these clusters once the analysis of an acquisition data segment is complete. One example of an implementation of such a system is described by Robert J. Inkol in U.S. Pat. No. 4,879,561 which was issued on Nov. 7, 1989.

A number of disadvantages exist with these previous systems such as that more data from the same signal source may be captured by the acquisition buffer before new tracking filters can be set up due to the processing delay associated with the acquisition cluster analysis. Since it is desirable that all data from an individual signal source be stored together in time-sorted order, all data associated with a new signal which falls in the acquisition buffer must be properly associated with the new track channel and stored properly in its data buffer using some standard sorting algorithm. This is complicated to implement. If the buffers associated with each filter are simple circular buffers occupying fixed blocks of address space in a memory, provision must be made to read PDW data from the acquisition buffer to the new track buffer before the latter receives any data from the newly created tracking filter.

A further disadvantage is that checks for overlapping track channel windows must be periodically performed in software which will cause a delay between the real-time collision of windows and the subsequent track channel merge operation. Since more data may fall into the overlap region during this delay, it will be inappropriately stored in all track channels involved in the overlap. These duplicate PDWs must then be removed when the track data is analyzed.

Another disadvantage is that as signals fall outside the hard limits implemented by the tracking windows, they must be re-acquired through the acquisition buffer, a new track channel must be set up and the old track channel terminated. Sophisticated software is required to determine that the new and old tracks represent the same emitter and provide the appearance of continuity to an operator. Any loss of continuity will frequently affect the quality of classification and identification processing as well as waste CPU time.

Another disadvantage of previous systems is that signals from the same emitter which fall into different regions of parameter space, for instance signals from frequency agile radars, will appear in different track channels. Even after such an emitter has been properly classified and identified, no hardware support is provided in these systems to merge the data in time-sorted order. This must be done by appropriate software processes in subsequent stages of the processing.

A further disadvantage is that PDWs from a new emitter which fall into an existing tracking window cannot be detected without periodically re-analyzing the data buffer. Brief illuminations may, as a result, be undetected and the response time will, in general, be slow. One approach which has been used to alleviate this problem is to use TOA as a tracking parameter. Since the PRIs of pulsed radar signals are often characteristic of that signal, time-gating techniques can then be used to separate PDWs from two or more emitters based on PRI patterns. Current designs require that the time-gating algorithms be implemented directly in hardware. However, a problem with this approach is that the signal must be re-acquired if the time-gating technique fails with subsequent loss of continuity.

SUMMARY OF THE INVENTION

It is an object of the present invention to provide an adaptive parametric data channelizer which avoids the above-mentioned disadvantages associated with previous parametric trackers.

An adaptive parametric channelizer, according to the present invention, for acquiring and tracking discrete interleaved signals comprises at least one sensor for detecting signal data, the sensor being connected to an input channelizer which is under control of a resource control processor connected to the input channelizer wherein signal data detected by a sensor is converted to pulse descriptor words (PDWs) and applied to a FIFO buffer of the input channelizer with the FIFO buffer's output being applied to a set of parameter filter devices, the filters being provided with a range of parameter values by the resource control processor to which the filters are connected forming windows for a set of tracking filters to which signal data is applied in parallel from the FIFO buffer, one filter being designated as an acquisition filter that is initialized by the resource control processor with a parameter space that is equivalent to the dimensions of a viewport through which all signal data of interest will pass, the filters being connected to a match list generator having outputs connected to a mapper and the resource control processor operating such that when a signal's PDW falls within one of the filter's windows, a match output for that filter is asserted and applied to the match list generator that maps asserted match inputs into a list of filter index numbers with that list being applied to the mapper and the resource control processor, the mapper transforming filter indices into track buffer indices in order to store a pulse descriptor word (PDW) associated with a match to one filter into an associated track buffer of a set of track buffers to which the mapper is connected, the combination of at least one parameter filter linked by the mapper with a track buffer forming a track channel.

An adaptive parametric channelizer, according to a further embodiment of the invention, comprises the resource control processor being provided with an acquisition interrupt service and a collision interrupt service, an acquisition event being generated when a PDW falls only within the parametric space of the acquisition filter and a collision event being generated when two or more tracking filter match on a single PDW, these interrupt services having means to disable the FIFO buffer's data flow on the occurrence of one of the events, a means to change the state of the parameter filter's windows in response to one of the acquisition/ collision events and a means to re-enable the FIFO buffer's data flow after a change of the state of the parameter filter's windows is completed.

BRIEF DESCRIPTION OF THE DRAWINGS

The following detailed description of the invention will be more readily understood when considered in conjunction with the accompanying drawings, in which.

DESCRIPTION OF THE PREFERRED EMBODIMENT

Figure 1:
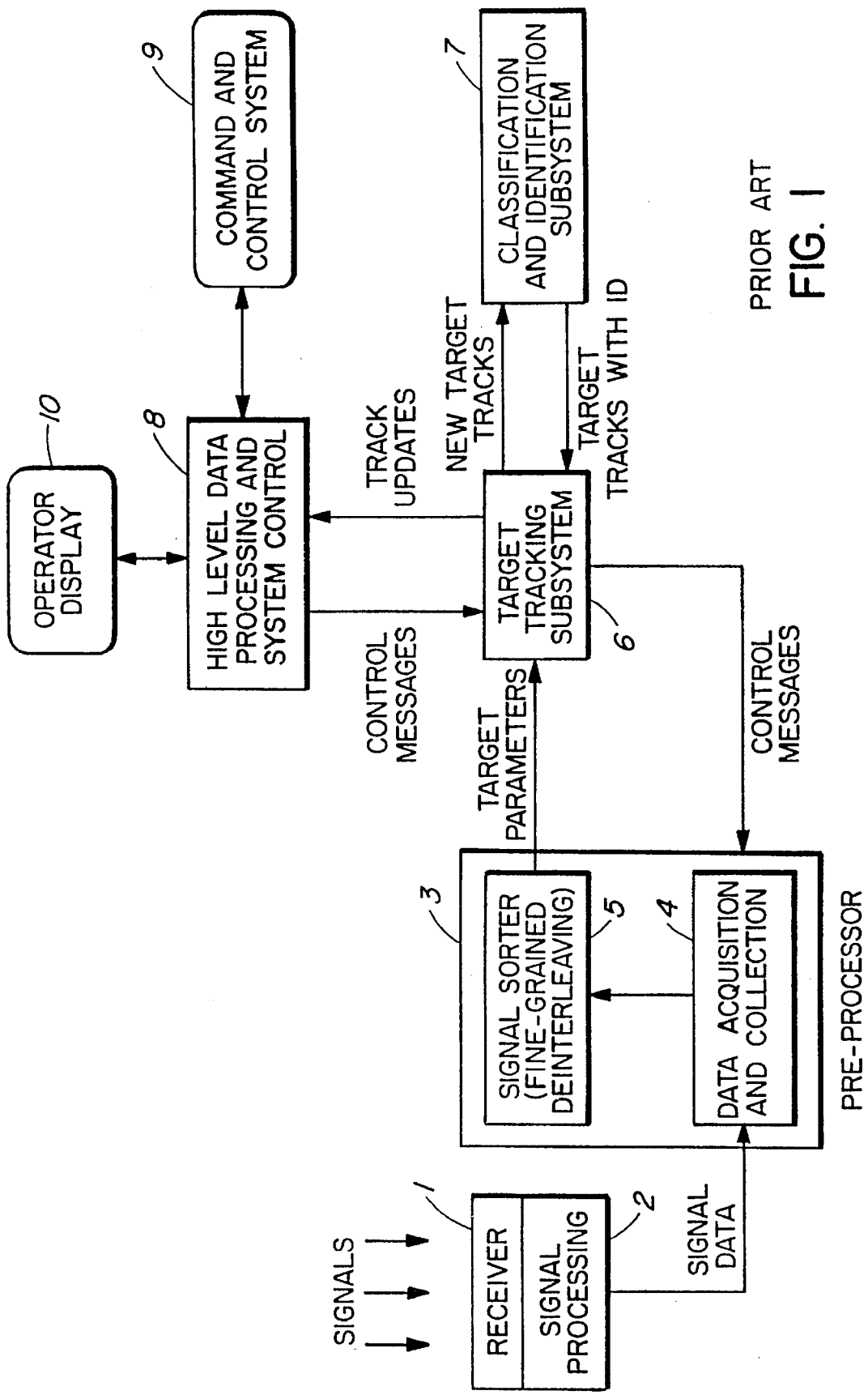
FIG. 1 is a block diagram for a generic sensor system.

FIG. 1 shows a block diagram for a generic sensor system in which signal data is received by receiver 1 and further processed to provide PDWs in signal processor 2 whose output is applied to a pre-processor 3. The function of pre-processor 3 is to deinterleave the PDWs into one or more separate emitter tracks or pulse trains which is essentially a correlation or sorting process often involving two stages. In the first stage 4, data is selectively captured and stored based on programmable parameter filters. These parameter filters are programmed with parameter ranges corresponding to emitters of signals which have been previously detected and classified. PDWs whose parameter fields fall within ranges which have been set for a particular filter are captured by that filter. This stage 4 of the pre-processor 3 is usually implemented with digital hardware in order to keep up with the high data rate of the incoming PDWs. The second stage 5 in pre-processor 3 may also be implemented in hardware but is more often a software process. The second stage 5 provides a more fine-grained analysis of samples of the incoming data in which data not captured by any of the existing parameter filters is sampled and analyzed to determine how many new emitters are represented in the sample. This data is then grouped and sorted into buffers corresponding to new emitter tracks. Any data from an existing filter is analyzed by second stage 5 to verify that the parametric behaviour of the emitter track associated with this window is unchanged.

An ESM system which performs emitter tracking must have a subsystem such as 6 which keeps parameter filters approximately centred on the incoming PDW data. In addition, any PDW data which is designated by the pre-processor 3 as a new emitter track is analyzed and classified. This function may be implemented within the target tracking subsystem 6 or it may be done by a separate classification and identification module 7 as illustrated in FIG. 1. This classification process is aimed at characterizing the behaviour over time of the pulse train as a whole in contrast to the pre-processor 3 which measures single pulses. Pulse train characteristics such as structure of pulse repetition intervals (PRIs), the pattern of any radio frequency agility and the emitter's scan pattern are measured in this classification process.

The target tracking subsystem 6 uses the results of the classification process to set up new parameter filters for new signal sources which will intercept any incoming data that should be associated with new tracks for those new signal sources. Furthermore, new tracks may be identified with one or more generic emitter types by matching their classification with an emitter database containing the characteristic parameter ranges of a large number of known emitters. Emitter tracking and classification as well as identification subsystems are usually implemented as software processes.

New emitter tracks and updates of old tracks are passed on from a tracking subsystem 6 for higher level processing at 8. This will involve maintaining a list of currently active emitters in the environment and forwarding this information to an ESM operator display 10 and/or to a higher level Command and Control system 9. The high level data processing at 8 may also include such functions as platform-to-emitter correlation, displays showing emitter/platform bearing and motion, interactive programs which allow the operator to perform additional data analysis and so forth. In addition, there are a number of system control functions implemented at 8 to provide interfaces between the lower levels of the ESM processing system, the ESM operator and the Command and Control System 9.

Figure 2:
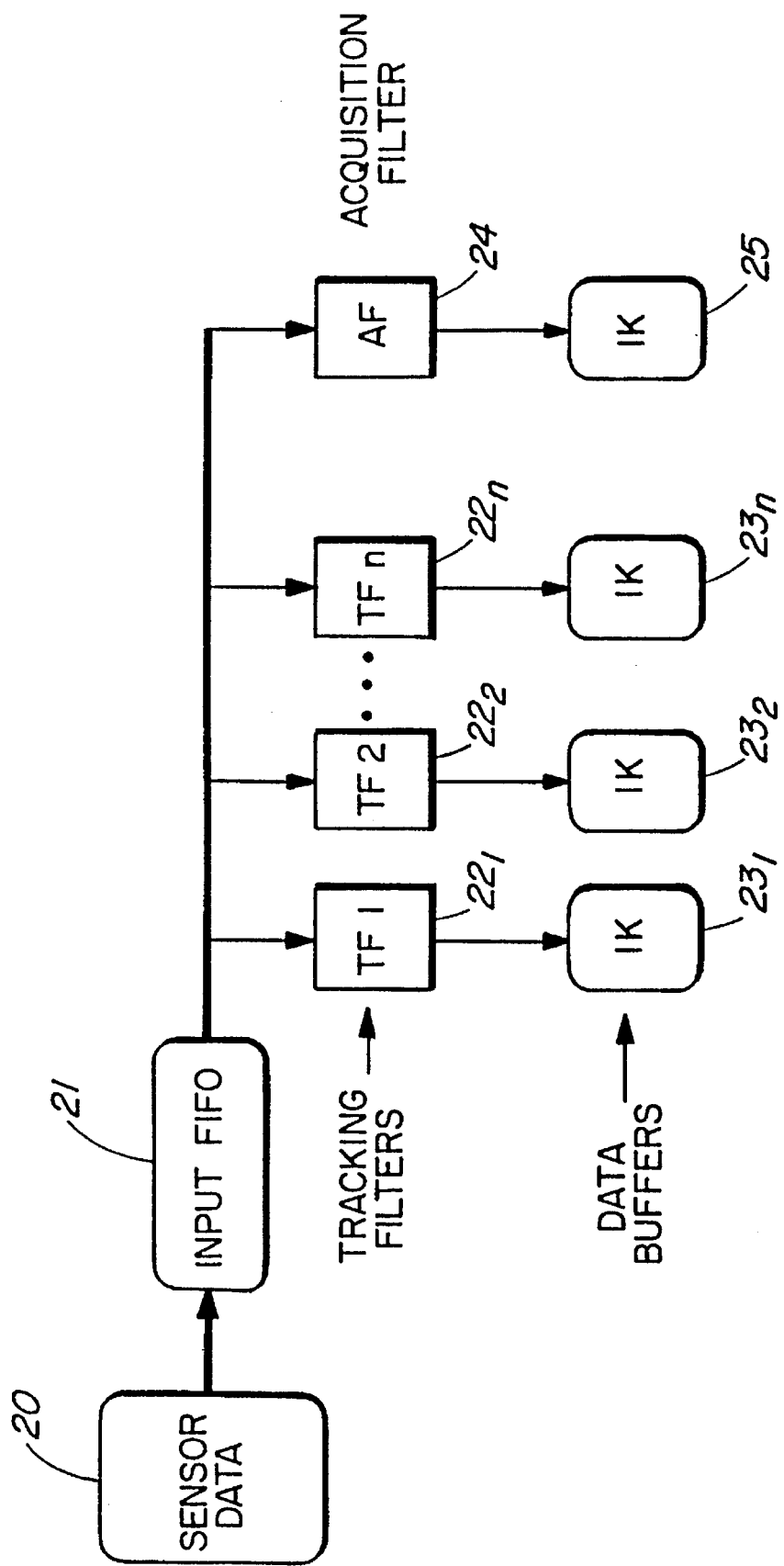
FIG. 2 is a block diagram for standard tracker architecture.

An example of a state-of-the-art parametric tracker is shown in FIG. 2. Signal data received at 20 and placed in the form of PDWs is applied to an input FIFO buffer 21. The PDWs parameters of interest are extracted and tested against a set of corresponding minimum and maximum limits in each of the tracking filters $22_1$, $22_2$-$22_n$ as each PDW is obtained from the FIFO buffer 21. For filters $22_1$, $22_2$-$22_n$ that detect a match, the entire PDW is stored in corresponding data buffers $23_n$ or, alternatively, those PDWs may be stored in a single large buffer using linked list techniques. The tracking filter plus the buffer constitutes one track channel.

A PDW is applied to an acquisition filter 24 when no other filter 22 claims that PDW. The PDW is then stored in an acquisition buffer 25 if the parameters of interest for this PDW fall within its viewport limits, i.e. the limits of the portion of parameter space being intercepted by this parametric tracker. The data collected in this buffer is then analyzed by a clustering algorithm to estimate the dimensions of one or more clusters that contain the data. Each cluster is formed using a nearness criterion where a data point is said to belong to a cluster if it is within a pre-set minimum distance from a pre-determined point in each parameter dimension. Further tracking filters are then tuned and enabled on these clusters once the analysis of an acquisition data segment is complete.

Figure 3:
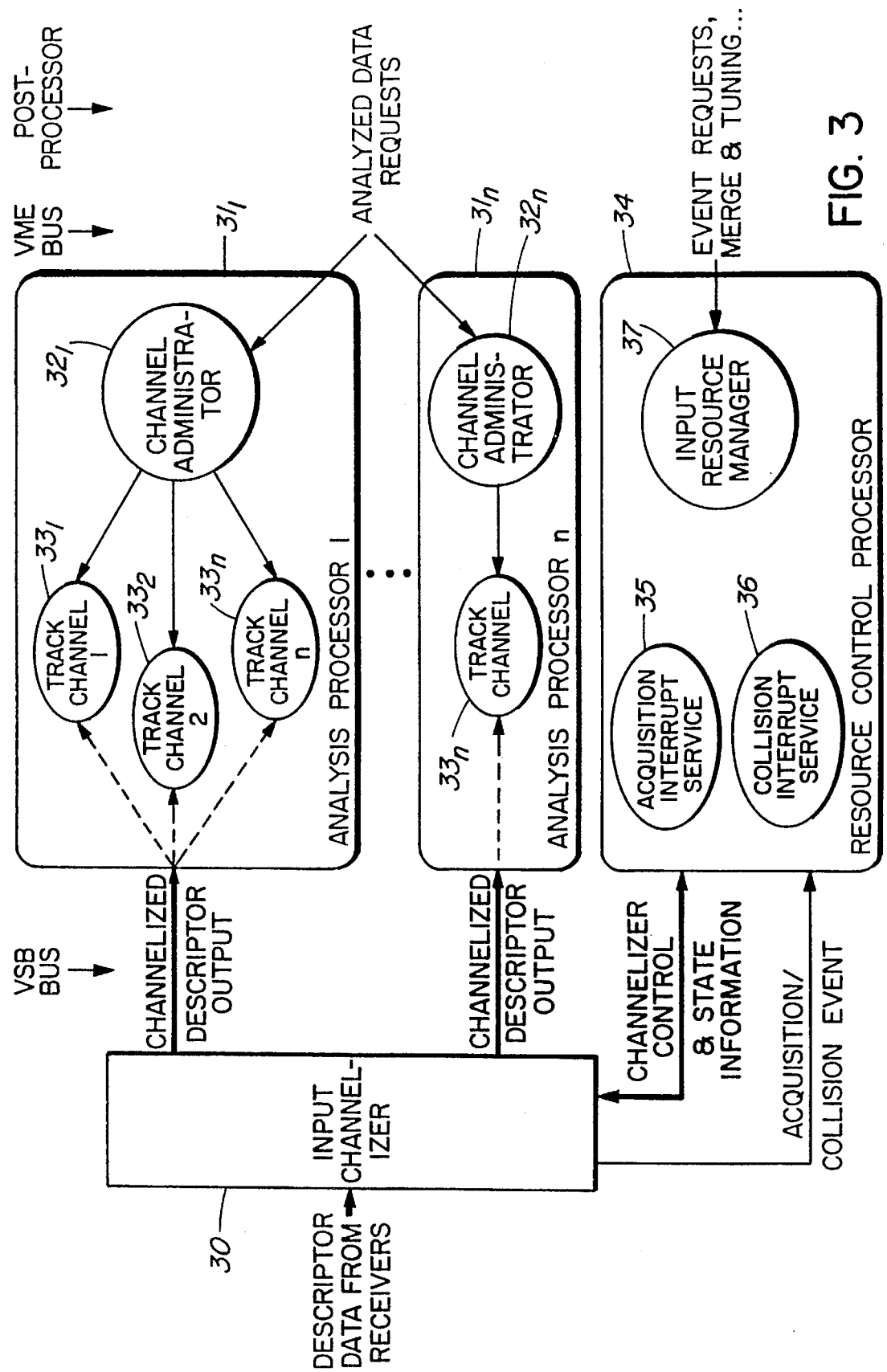
FIG. 3 is a diagram of a tracker architecture according to the present invention.

The architecture of the new Adaptive Parametric Channelizer (APC) according to the present invention is shown in FIG. 3. This Adaptive Parametric Channelizer consists of an Input Channelizer 30, implemented using custom digital hardware, and a Resource Control Processor (RCP) 34 which is implemented in this embodiment using a commercial single board computer together with control software algorithms. However, this Resource Control Processor 34 could be implemented using an embedded microprocessor plus firmware. The APC accepts unsorted PDW data from an ESM receiver and produces a number of track channel data streams, each of which is associated with individual signals in the input environment. Analysis Processors $31_1$-$31_n$ would then be used to process each of these data streams. The Input Channelizer 30 custom hardware supports a local high speed data bus, a VSB* Subsystem Bus in this embodiment, which is used to interface to the Analysis Processors $31_1$-$31_n$ so that data access events can occur without adversely affecting overall system performance. Processed data streams produced by the Analysis Processors $31_1$-$31_n$ are then passed to subsequent standard processing stages (not shown) where functions such as emitter classification and identification and the interface to an operator are performed. All of these subsequent processing functions are referred to as the ESM post-processor for convenience.

* trade mark

The function of the Input Channelizer 30 is to separate the input data stream of PDWs into channels which correspond to PDW clusters that have been grouped using a subset of the measured parameters. These clusters are initially defined and subsequently maintained by a set of algorithms within the Resource Control Processor 34 with some high speed hardware assistance from the Input Channelizer 30. The Resource Control Processor 34 also provides an interface between the Input Channelizer 30 and external devices such as the Analysis Processors $31_1$-$31_n$ and the ESM post-processor. Events such as the acquisition of new signals and commands such as forced track channel merges as well as other cluster tuning requests are also handled by the Resource Control Processor 34.

Time critical processing associated with events generated by the Input Channelizer 30 hardware are handled by acquisition interrupt service 35 and collision interrupt service 36 routines within the Resource Control Processor 34. The routines in 35 and 36 use a shared data region in which free and allocated resource information is kept. This information may be modified if external requests affect the resources of the Input Channelizer 30. The Resource Control Processor 34 also contains an Input Resource Manager 37 which handles event requests such as merge and tuning. The event interrupts, such as 35 and 36, and other data communication with the Input Channelizer 30 are handled over the VSB* bus in the present embodiment.

* trade mark

Any analysis of the channelized PDW data is handled by the Analysis Processors $31_1$-$31_n$ which are not actually considered as being part of the Adaptive Parametric Channelizer. In the present embodiment, the Analysis Processors are in fact other processors within the pre-processor. However, they could just as easily be implemented as a separate subsystem.

Figure 4:
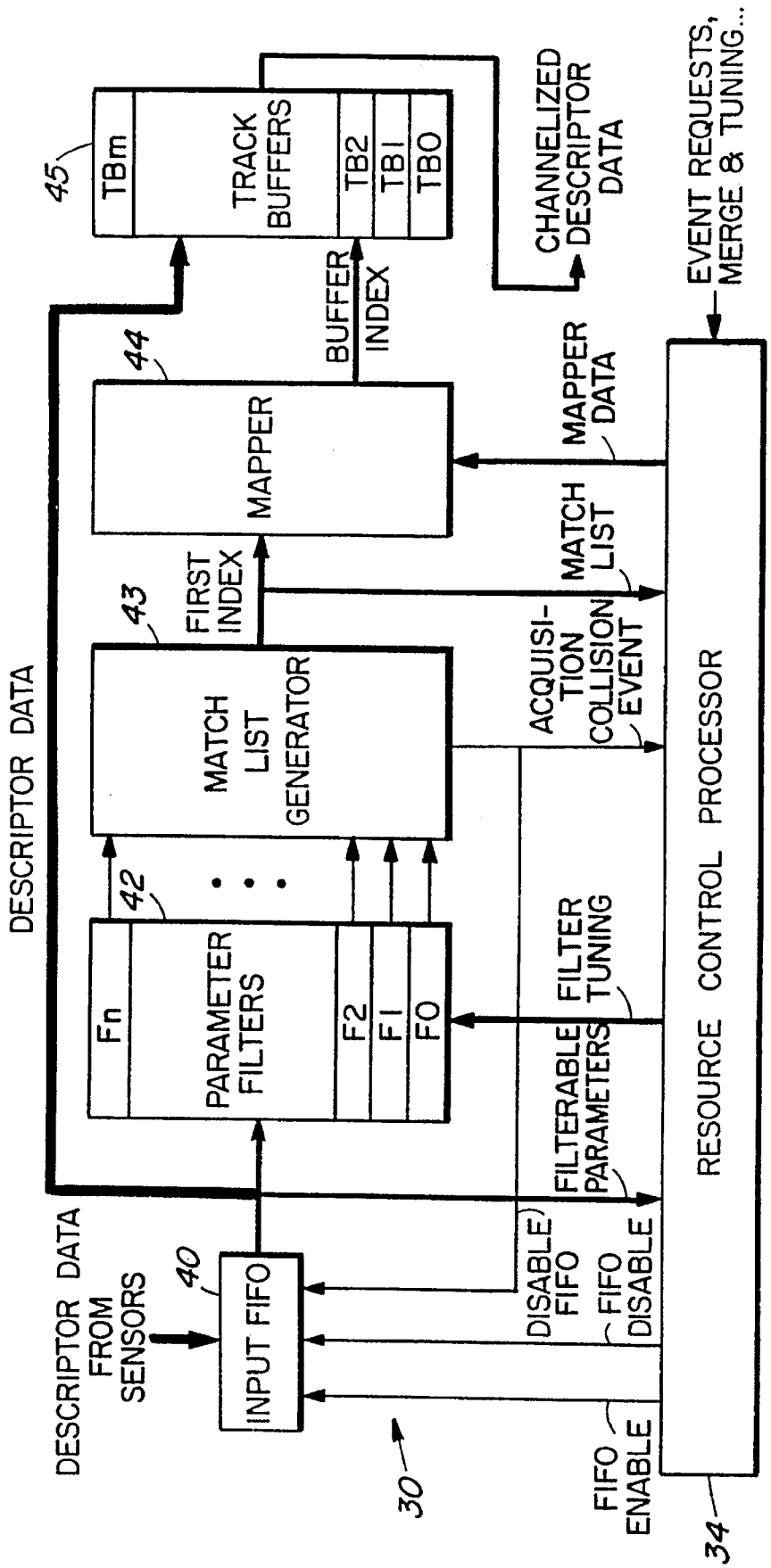
FIG. 4 is a block diagram of an input channelizer shown in FIG. 3 and its connection to a resource control processor.

The architecture of the Input Channelizer 30 hardware and the communications connections of the Resource Control Processor to it are shown in FIG. 4. The incoming PDW data to Input Channelizer 30 is buffered by the input FIFO buffer 40 so that changes to the state of the Input Channelizer 30 can be made with the data flow disabled, i.e. temporarily delayed by buffer 40. The PDWs are extracted from the FIFO buffer 40 and filtered in parallel at 42 by a set of parameter filter devices $F_{o-Fn}$. The parameter range assigned to each filter is defined by a window describing the dimensions (minimum and maximum limits) of the relevant parameters. Each filter also responds to a set of flag inputs from the PDWs and can match on the flags being either set or cleared. The flags can also be individually disabled.

When a PDW falls within a filter's window and the selected flags match their corresponding programmed flag states, a match output corresponding to that filter is asserted and applied to a Match List Generator 43. The Match List Generator 43 maps the asserted match inputs into a list of filter index numbers for each PDW that is presented to the parameter filters $F_o$ to $F_n$. This list is then applied to a Mapper 44 and to the Resource Control Processor 34 for use when events occur such as the acquisition of a new signal or a filter collision when a PDW falls into a parameter window occupied by two or more parameter filters.

Logic within the Match List Generator 43 identifies any special acquisition and collision conditions. One of the parameter filters $F_o$ to $F_n$ is designated to be an acquisition filter, similar to filter 24 in FIG. 2, in order to detect new data. All other parameter filters are considered to be tracking filters similar to filters $22_1$ to $22_n$ in FIG. 2. The acquisition filter is initialized with a parameter space which is equivalent to the dimensions of a viewport, i.e. defined area of parameter space, through which signal data of interest will pass. An acquisition event is generated if a PDW falls within only the parameter space of the acquisition channel and no other enabled parameter filter matches on the selected parameters of that PDW. A collision event is generated if two or more tracking filters match on a single PDW. Processing associated with each of these events will cause the state of the input filter hardware at 42 to change. The input FIFO data flow is, as a result, disabled by Resource Control Processor 34 in order to prevent contention between further PDW processing and these changes to the state of the filters. The Resource Control Processor 34 will re-enable the FIFO data flow when those changes are completed. The period during which the flow of data is disabled should be minimized in order to avoid loss of data due to FIFO overflow.

The first filter index in the match list is transferred into a track buffer index by the Mapper 44 and is used to store the PDW associated with that match into the Track Buffer 45. Track buffers are circular so that only the most recent data is kept when a buffer full condition occurs. The Mapper 44 provides an indirect addressing capability so that any of the parameter filters may be assigned to any track buffer.

All data for the PDWs are uniquely associated with the track buffer indices which can be used to support external access by the Analysis Processors. It is possible, using the Mapper, to capture data from more than one filter window by assigning the same track buffer to all mapper addresses corresponding to these filter index files. The feature has an important application in that it supports direct collection of time-ordered PDW data from frequency agile emitters.

Events of interest to the Resource Control Processor 34 are generated by the Match List Generator 43 and are associated with certain match conditions that may occur as each PDW is filtered. These conditions arise from logic associated with the acquisition and collision algorithms. A third condition, not shown in FIG. 4, is associated with an optional algorithm that will improve input filtering. This capability is known as leading edge tracking and will be described latter.

Other control and data interfaces are required by the Resource Control Processor in order to manage the parameter filter windows. When a new signal is acquired, the selected filter parameters are used to tune a new filter onto that signal. The Mapper 44 must be set at this time in order to capture future data from the new signal. However, certain functions such as filter tuning require that the channelizer hardware be free of PDW data during the tuning steps. Therefore, the Input FIFO 40 data flow can be enabled or disabled as required by the Resource Control Processor.

The Resource Control Processor 34 must initialize the Adaptive Parametric Channelizer (APC) before any data collection can begin. In order to do this, it first sets up two resource lists, one containing a set of free parameter filters and the other a set of free track buffers. The parameter window of the designated acquisition filter is set to be the viewport which is typically specified by the post-processor or operator. The Mapper 44 is set so that a PDW that is matched by the acquisition filter is captured by a track buffer channel and the resource lists are appropriately updated. The remaining parameter filters, other than the one designated as an acquisition filter, are set to the disabled state. At this point, data flow from the Input FIFO 40 can be enabled by the Resource Control Processor 34.

An acquisition event is generated when the Match List Generator 43 detects that the designated acquisition filter and no other parameter filter matches on one of the PDWs. The flow of data from the Input FIFO 40 is disabled in response to this event and the acquisition interrupt service 35 within the Resource Control Processor 34 obtains the selected PDW values from the hardware. The Resource Control Processor 34 then sets up a new parameter filter on a window with a default fixed radius in each of the parameter dimensions of interest. This new filter is then mapped to the existing acquisition track buffer by entering the appropriate buffer index into the Mapper 44. A new track buffer is obtained from the free track buffer list and associated with the acquisition filter by the Mapper 44 so that the next acquisition PDW can be captured by the new parameter filter and track buffer. Data flow from the FIFO 40 is then re-enabled. This whole acquisition process occurs upon the reception of a single new PDW and is therefore referred to as instantaneous signal acquisition.

The combination of one or more parameter filters with a track buffer, linked via the Mapper 44, is referred to as a track channel. A track channel may be thought of as a single virtual device since the action of the Mapper 44 is, for the most part, hidden from external clients of the Adaptive Parametric Channelizer. A track channel can be uniquely identified by its track buffer index since each track channel includes one and only one track buffer. Track buffers and their indices are reused but only after an explicit terminate operation has been invoked on the associated track channel and notification been given to clients. The default initial window size is determined by the end-user experimentally based on typical sensor data. The choice of optimum radius values is a compromise since values that are too small cause a large number of filters to be created whereas values which are too large result in more than one signal being captured within a single filter's parameter window.

Some action must be taken by the Resource Control Processor 34 to notify the Analysis Processors, post-processor and/or operator that a new track channel has been created when an acquisition event occurs and to provide the track buffer index associated with it. The type of specific action which must be taken can vary from system to system. Therefore, provision is made for a user-supplied acquisition notifier routine which provides software control over this part of the process. In the present embodiment, the acquisition notifier informs both the Analysis Processors 31 and the post-processor of an acquisition event and supplies the index for any new track channels created.

Overlap or collision of the parameter windows which are defined by two or more filters will only be detected when a PDW falls into the overlap region. Therefore, it is possible that several filters can overlap in parameter space for extended periods of time without having any effect on the input channelizing of data. This feature is highly desirable since it reduces the number of collisions and minimizes processing requirements. When a PDW does fall in the overlap region, the Match List Generator 43 creates a collision event and supplies a match list, i.e. a list of filter index numbers that correspond to all the filters which have matched the PDW. The channelizer hardware then stores the PDW in the track buffer corresponding to the mapper entry for the first filter index in the match list which process will capture that PDW in only one track buffer. No special selection logic is required, as a result, to determine which track buffer of the set involved in the collision is to receive that PDW.

The Resource Control Processor 34 is interrupted by any collision event and invokes the collision interrupt service 36 routine which will disable any data flow from the FIFO buffer 40. The Resource Control Processor 34 will then adjust the parameter filters which appear in the match list. However, the processing is different depending on whether individual filters in the match list are mapped to the same or more than one track buffer which results in either a local collision or a global collision respectively.

A local collision is one in which all the filters in the match list are mapped to the same track buffer. The collision interrupt service 36 will select one of the filters and expand its parameter window to include the windows occupied by all other filters in the match list when a local collision has occurred. The other filters in the match list are then disabled and added to the filter free list so that they can be re-used. None of the other processing sub-systems need to be informed of this event since the collision is local to a single track buffer. The FIFO data flow is re-enabled after the local collision processing is completed.

A global collision is one in which the filters in the match list are mapped to more than one track buffer. The collision interrupt service 36 will again select one of the filters and expand its parameter window to include the space occupied by all other filters in the match list when a global collision has occurred. The other filters in the match list are then disabled and added to the filter free list so that they can be re-used which process, up this point, parallels the processing for a local collision. However, this global collision involves two or more track buffers and all surviving filters that were mapped to those buffers are redirected to a new track buffer using the Mapper 44. The new track buffer, i.e. the post-collision buffer, is obtained from the track buffer free list. Although the track buffers involved in the merge will no longer receive PDW data, they are not returned to the free list until they have been explicitly de-allocated since they may still hold unprocessed data. A special data word called a terminator will be appended to these original track buffers which marks the end of the data and provides an index of a new track channel for those buffers. Next, a merge entry is prepared which contains a list of all the track buffer indices which were involved in the collision as well as the index numbers of the post-collision track channels. This information is stored in a merge history list in the Resource Control Processor 34 which then re-enables the FIFO data flow.

There are two conditions which can cause track channels to merge. A first one arises from a filter collision within the Input Channelizer 30 as previously described and can be handled independently without reference to the post-processor. A second, different type of merge may be generated externally when, for example, the post-processor finds that a number of track channels are processing data from the same signal source. The post-processor will normally issue a merge request to the Resource Control Processor 34 in order to rectify this situation. A merge history list is maintained in the Resource Control Processor 34 so that the correct track channel targets can be found when processing external merge request. Note that the two merge conditions may arise concurrently and that post-processing may considerably lag the real time track channel allocation. Therefore, a merge request might well involve an inactive track channel due to processing delays. That inactive track channel could be one which is no longer receiving PDW data since it has already been the target of a merge. In this type of case, the Resource Control Processor 34 can determine which active track channel is currently responsible for that portion of parameter space assigned to the inactive track channel from the merge history list.

A new track channel is always created when either type of merge occurs and all the filters which were mapped to the merged channels are re-mapped to the new channel. A merge entry consisting of the merged channels index list and the index of the new channel is then prepared and stored in the merge history list. Adjustments and accesses to the merge history are protected functions that must only occur in certain stages of the resource management processing. In the collision merge case, the merge entry is made only when both the FIFO data flow is disabled and the interrupts services (35 and 36) are disabled on the Resource Control Processor which will prevent an external merge request from being accepted at the same time as a collision merge is being processed.

The Resource Control Processor 34 supports two access functions internally for merge history data, i.e. find and search functions. The find function takes some track channel index, for instance K, and recursively examines its merge history from the merge history list. If the track channel K has been the subject of a merge, then the most recent target track channel is returned. The most recent target track channel is the one currently responsible for that portion of parameter space previously assigned to track channel K. This function is used to find the most current target track channel when external tuning instructions which refer to a single track channel are received. The search function accepts a list of track channel indices and returns a new list in which any original entries that appear as merged channels in the merge history are replaced by the corresponding current track channel indices. This search function is used for any external merge function received by the Resource Control Processor 34.

The Input Channelizer 30 operates autonomously with respect to the post-processor when new signals appear in the environment or when filter collisions occur. In other words, under direction of the Resource Control Processor 34, the Input Channelizer 30 detects any new signals or filter collisions and modifies its state to accommodate these new situations without direction from the post-processor. Only the results of such changes in state are made known externally. The channelizer also encapsulates the parameter filter's mapping so that it need not be externally known which set of filters are mapped to any one track buffer or the parameter space to which they are tuned.

The Resource Control Processor 34 provides client services and interfaces between the Input Channelizer 30 and clients such as the Analysis Processors 31, the post-processor and an operator. These client services include access services and tuning services which are summarized in attached Table 1 and described in more detail below.

Access services, as the name implies, provides limited information about the internal state of the track channels as well as data access. Most of these services are straightforward. The access services include the following:

(1) getStatus (ID), (2) getWindows (ID), (3) getCount (ID), (4) getBufferFullFlag (ID), and (5) getData (ID)

where ID is the track channel index.

The getStatus function, taking a track channel index as its argument, indicates whether the track channel is currently active, inactive or free. A track channel is said to be free if the track buffer with the same index is on the free list. A track channel is said to be inactive if the track buffer with the same index is no longer associated with one or more parameter filters.

The getWindows function, taking a track channel index as its argument, returns the parameter windows of filters currently associated with the specified track channel. If that track channel is inactive, the request fails.

The getCount function, taking a track channel index as its argument, returns the current number of pulses in the specified track channel buffer.

The getBufferFullFlag function, taking a track channel index as its argument, returns true if data in track channel's circular track buffer has been overwritten since the last getData request.

The getData function, taking a track channel index as its argument, returns the PDW data and/or terminator in the track channel's buffer. Terminators are special data words which alert the client that the track channel in question has become inactive. Merge, split and termination events will all result in an inactive track channel with terminators for each event having different formats which will be discussed later.

Note that in addition to the getData Resource Control Processor 34 service, the Input Channelizer 30 also supports direct memory-mapped access to PDW data, the buffer full flag and the pulse count. In the present ESM embodiment, this is accomplished via a VSB* bus connection. Direct access is necessary in an Electronic Support Measure case in order to meet real-time performance requirements driven by high input data rates. Concurrent access to separate track channels is also supported by this arrangement.

* trade mark

The Tuning Services of the Resource Control Processor include the following items:

(1) setWindow (ID, Window), (2) trimLeft (ID, PRMTR, Value), (3) trimRight (ID, PRMTR, Value), (4) split (ID, PRMTR, Value), (5) merge (IDList, Window), (6) remove (ID), and (7) terminate (ID) where ID=track channel index, IDList=list of IDs and Value=an integer value. PRMTR=parameter of radio frequency (RF), pulse width (PW) or bearing (BRG). A window=(RFHi, RFLo, PWHi, PWLo, BRGHi, BRGLo) where RFHi(Lo)= Upper (Lower) RF boundary, PWHi(Lo)=Upper (Lower) PW boundary, and BRGHi(Lo)=Upper (Lower) BRG boundary.

Following, is a description of the SetWindow service. A track channel was previously defined as a set of parameter filters together with a track buffer. However, how a number of filters are mapped to a single track buffer has not yet been explained. This occurs as a result of external track channel merge requests, usually in an attempt to direct all data from a frequency agile radar to a single track buffer. External merges are requested by the client processor when it is believed that a number of track channels are processing data segments from the same signal source. It may be desirable to force all filters mapped to a track channel to become one filter after one or more external merge requests. This is accomplished by invoking the setWindow service which takes as its arguments a track channel index and an optional window descriptor. A window description is a sextuple of integer values which define upper and lower limits for radio frequency (RF), pulse width (PW) and bearing (BRG). This particular tuning request is implemented by first disabling the FIFO data flow and the interrupts (35,36), then selecting a filter from the set that are mapped to the track buffer associated with the designated track channel. If the optional window descriptor is provided, the parameter limits of the selected filter are set to match those requested. If no window descriptor is specified, the minimum window which contains all of the filter windows associated with the designated track channel is computed and the parameter limits are set to that value. In either case, the remaining filters which were originally mapped to the track buffer are disabled and put back on the filter free list and then the FIFO data flow and interrupts are re-enabled. If the setWindow is invoked on an inactive track channel, the requests fails. If the track channel is free, an error flag is raised.

The portion of parameter space assigned to a particular track channel will often expand beyond the initial window which was created during acquisition processing as a result of collisions and merge processing in the Input Channelizer 30. In addition, parameter data which has a higher variance than originally expected will also result in expanded windows. This higher variance could be caused, for instance, by one or more of the signal parameters being agile. To correct this requires an understanding of the structure of intercepted signals which is beyond the scope of the Resource Control Processor's 34 capabilities. Therefore, provision is made for fine tuning direction from other subsystems, such as by the Analysis Processors $31_n$ or the post-processor.

Filter window fine tuning, as shown in Table 1, is accomplished by invoking one of two service calls, trimleft or trimright. These two services allow a client processor to reduce the size of parameter windows. Note that there is no need for facilities to expand windows other than the set-Window service since the auto-tracking process implemented by the acquisition and collision logic, which was previously described, will expand windows when necessary to track signals. This requires no external directives. Fine tuning is implemented by first disabling the FIFO data flow and the interrupt services 35 and 36. The find access function provided by the merge history is then used to determine if the designated track channel has been the subject of any merges. If it has been subject to merges, the active track channel associated with it is returned. Once the correct filter set and parameter windows have been determined, the filters which are to remain mapped to the track buffer are re-programmed with new parameter windows. Those filters which are to be removed are disabled and then the FIFO data flow and interrupt services are re-enabled.

The choice of which filters remain enabled and the values of their corresponding parameter spaces depend on which trim instruction is issued (left or right) and what parameter values are defined. If the trimLeft instruction is selected, the left hand edges of all filters associated with the designated track channel are moved towards the right to become the values defined by the parameters. Any filter which is found to be totally to left of the new left hand boundary is removed while any filter found to be totally to the right of the boundary is unaffected. If the trimRight instruction is selected, the right hand edges of all filters associated with a track channel are moved towards the left to become the values defined by the parameters. Any filter that is found to be totally to the right of the new boundary is removed while any filter found to be totally to the left of the boundary is unaffected.

In this particular embodiment for an Electronic Support Measures case, the trimLeft and trimRight services are used to mainly "focus" parameter windows in the angle-of-arrival (target bearing) dimensions. Parameter windows tend to "stretch out" over time in this dimension due to the motion of the emitter and need to be "re-focused" on the current emitter bearing. The Resource Control Processor 34 has no facilities for tracking platform motion and, as a result, it requires direction in this regard from client processors. Several seconds may be required to process PDW data, pass results on to the client processor, execute a target tracking algorithm such as a Kalman filter and to send directives back to the Resource Control Processor 34. These inevitably introduce some processing delay although these delays are not, in practice, particularly significant since the rate of change in target bearing is relatively slow (measured in seconds or minutes) compared with other ESM events which are measured in microseconds or milliseconds.

The design of this type of tuning algorithm allows multiple filter windows which cluster in one or two dimensions to remain distinct in the non-clustered dimensions. For example, several frequency windows associated with a frequency agile radar can be trimmed in angle-of-arrival (AOA) since they share a common bearing while continuing to cover distinct regions of frequency space.

A split tuning service is provided since, occasionally, it is necessary to split the parameter window associated with a track channel. This requirement is dependent on the signal environment. It can occur, for example, when two signals which are being tracked by a single track channel move apart in bearing. When the data cluster in the parameter space for each emitter becomes sufficiently distinct, a client processor may wish to divide the parameter space so that two separate track channels can be used to process the data. Decisions such as these require knowledge about the underlying signal structures and statistical behaviour. Therefore, these decisions must be made by a subsequent processing stage.

The actions associated with a track channel split begin when the split service is invoked by a client processor. This action should only be taken along one parameter cut line at a time since splitting along more than one cut line may cause an indeterminate number of track channels to be created. Split processing is considered a critical section and therefore the interrupts and the FIFO data flow are disabled. This ensures that the new filters and their associated track buffers are completely set up before any additional PDW data is processed. The merge history list is first checked to see if the specified track channel had been merged by a filter collision. The request fails if this is the case since a previous merge action would have moved all the filters associated with that channel to some other target buffer. If such a merge entry is found, the interrupts and FIFO data flow are re-enabled and processing ceases. However, processing will continue if no merge entries are found.

In split processing, a collection of left and right windows are made from the set of filter windows associated with the channel to be split. This is accomplished by splitting each window in the set along the given cut line using trimLeft and trimRight functions. The left filter windows are created by trimming the right hand side of parameters left towards the cut line and the right filter windows are created by trimming the left side of the parameters towards the right. Once this procedure is completed, the (trimmed) filters are disconnected from the original track buffer and, instead, connected to two new buffers. This creates two new track channels, one for each of the left and right signal sources. Both of these track channels are created using the same detailed processing steps as for a collision merge.

Once the above critical section in split processing has been completed, the interrupts and FIFO data flow are re-enabled. Finally, a split terminator containing the left and right track channel indices is appended to the split channel's buffer. When the split channel is cleared of data by a client processor, the split terminator will indicate to the client that no more data can be expected from this track channel and that subsequent data will come from the new left and right channels. It is expected that when the client receives this message, it will invoke the remove service, so that the track buffer allocated to the split track channel can be released. The remove service will be described in more detail later.

External merges are requested by the client processor when it is believed that a number of track signals are processing data segments from the same signal source. When this situation occurs, a new track channel can be created and all filters that were mapped to the merging channels are re-mapped to the new target channel. The merging channels will be marked with a merge terminator and subsequently removed.

The merge service takes as arguments a list of the indices of the track channels to be merged and, optionally, a parameter window. It is implemented by first disabling the FIFO data flow and the interrupt services. Then, the search merge history service is invoked to determine the list of active track channels corresponding to those identified in the argument of the merge call. All filters that were previously mapped to those track channels are then re-mapped to a new track buffer which is obtained from the track buffer free list. If a window has been specified for the optional argument, the setWindow service is invoked on the new merged track channel. Finally, the FIFO flow and interrupt services are re-enabled. Once this time critical part of the merge is completed, the Resource Control Processor 34 prepares a merge terminator which contains the number of track channels being merged and the index of the new merged track channel. The merge terminator is appended to each merging channel's buffer. When the inactive channels are cleared of data by a client processor, the merge terminator will indicate to the client that no more data can be expected from those track channels and that subsequent data will come from the new channel designated in the merge terminator. Since the merge terminator also indicates the total number of channels which were merged, the client processor can determine when all of the merged channels have been cleared. This will also permit it to delay processing on the new channel until all of the inactive ones have been dealt with. It is the responsibility of the client processor to invoke the remove service on the inactive channels. This will release the track buffers allocated to the inactive channels.

Track channels which were involved in a merge will no longer accept data since their filters have been mapped to new track channels which carry on collecting data. These old track channels and their associated track buffers remain in an inactive state until all the data remaining in the buffer has been cleared by a client processor. Once that data has been cleared, the client processor can then invoke the remove service so that the hardware resources can be reclaimed for later use.

The remove service accepts a track channel index as argument and is implemented by first determining whether the designated track channel is still active or free. In both these cases, an error flag is raised. If the designated track channel state is inactive, then processing proceeds by first disabling the FIFO data flow and the interrupt services. All references to the track channel are next removed from the merge history list and then the FIFO data flow and interrupt services are re-enabled. The associated track buffer is then placed on the free list.

References must be removed from the merge history list so as to ensure that the list remains consistent. The track channel being removed may appear in that list on either the left side, i.e. channels being merged, or the right side of a merge entry as a new channel created by a merge. The track channel to be removed can appear in at most two entries, once on each side, since any channel which has been merged becomes inactive. The merge history list is first searched to determine if the track channel appears on the left side of any entry. If it does, this will be referred to as a "merge entry". If the track channel appears on the right side of any entry, this will be referred to as the "target entry".

If there is no "merge entry", the "target entry" is just removed. However, all track channels on the left side of the "target entry" must also be removed to keep the list consistent. If there is a "merge entry" and also a "target entry", the merged channels on the left side of the "target entry" are added to the left side of the "merge entry", the "target entry" is removed and the track channel is deleted from the left side of the "merge entry". The track channel is just deleted from the left side of the "merge entry" when there is no "target entry".

In order to more clearly illustrate the effect of a remove tuning service, assume that the merge history contains two entries wherein track channels A and B merge into C and channels C and D merge into E. This is illustrated below as:

(1) (A, B)→C (2) (C, D)→E If C is to be removed, it is first discovered as a merged channel and removed from the second entry. C is then discovered in the first entry and channels A and B are added to the left side of the second entry, giving:

(3) (A, B)→C (4) (A, B, D)→E

The first entry is then removed from the list.

Client processors can use the terminate service to shut down track channels. There is no target track channel that takes over to analyze subsequent data in this case, unlike the merge or split services. The client processor will, typically, invoke the terminate service when it is perceived that signal emissions being captured by a particular track channel have stopped. The terminate service accepts a track channel index as argument and is implemented by first determining whether the designated track channel is inactive or free. In both of these cases an error flag is raised. However, processing proceeds if the track channel is active by first disabling the FIFO data flow and the interrupt services. Then all filters that are mapped to that track channel are disabled. Next, any references in the merge history list are removed since the designated track channel may have been created by a merge and, finally, the FIFO data flow and interrupt services are re-enabled. An event descriptor is prepared indicating that the track channel has been terminated, similar to the cases with a merge or split event. When the track channel is next asked for data by a client processor, it will detect the terminator at the end of the data stream in the same manner as with a merge or split event. Special processing associated with the terminate request to the client processor can then be completed which will include invoking the remove service so that the track channel and associated track buffer resources can be reclaimed.

For the signal acquisition algorithm previously described, any significant parameter movement in any dimension will cause new track channels to be created as the measured parameter values move outside of the initial windows. Experience has shown that during the initial acquisition of a signal which has large variations in measured parameter values, several new track channels will be created to cover the signal as the parameters continue to fall outside of the initial windows. It is likely that the majority of the newly created filters will merge together in most cases as time progresses since new parameter measurements will tend to fall into their overlap regions. These filters will quite likely overlap upon creation since the parameter values which trigger their creation will be just outside the limits of the initial filter window. A modified acquisition algorithm can be used in order to minimize this effect. This algorithm, referred to as the leading edge tracking algorithm, employs two filters that are initially set up upon acquisition. One of the filters is set up with an inner (parameter) window centred on the initial PDW. The other filter is then tuned to an outer window which is larger than the inner window by a predefined increment in each parameter dimension. The value of this increment is user defined and can be most effectively determined by experimenting with typical data for the type of signals expected.

Any PDWs which fall into the inner windows are simply stored in their corresponding track buffers as more data is received and no interrupt need be generated for the Resource Control Processor 34. However, the Resource Control Processor would be interrupted if a PDW falls between the inner and outer window of a filter pair. A leading edge tracking service routine would then be invoked which would first disable the FIFO data flow and the processor interrupt services. Next, the limits of the inner window would be adjusted to include the PDW which triggered the interrupt and the outer window would once again be tuned to be incrementally larger. Finally, data flow from the FIFO and the processor interrupt services would be re-enabled.

Collision detection will occur when a PDW falls into the overlap region of the outer windows under this scheme. This will cause a filter to be tuned to the largest space occupied by the set of inner filter windows involved in the collision. A single outer filter window would then be created which is incrementally larger than the new inner window. Other external filter tuning functions such as trims and splits will similarly affect the inner/outer filter window pairs.

The leading edge tracking algorithm when implemented in software lacks the real-time performance required for an Electronic Support Measures system. However, the real-time performance can be improved by enhancements made to Input Channelizer's (30) hardware. A first enhancement to that hardware for implementing a satisfactory real-time performance requires that the parameter filter bank and associated Match List Generator be physically divided into two sections, one section for the inner windows and the other section for the outer windows. Special logic then compares the outputs of the two Match List Generators as each PDW is processed. For matches that occur on both the corresponding inner and outer filters, the processor interrupt would be suppressed and the PDW stored in the track buffer corresponding to the mapper entry. The Match List Generator for the outer filter window set only needs to be connected to the mapper for this. If a match occurs on the outer filter but not on the corresponding inner filter, the processor is interrupted so that the windows of the filter pair can be expanded. Storage of the PDW occurs in the same manner as with the suppressed interrupt case. Collisions are detected in the same manner as with the original algorithms but using the outer filter match list. Acquisition detection uses the outer filter list where a special outer acquisition filter index is defined. No inner acquisition filter is required.

An alternative implementation of the leading edge tracking algorithm can be made by the addition of an adder to the parameter inputs in a filter bank. Upon reception of a PDW, the adders initially add zero to each of the filterable parameters and the resulting match list is recorded as a reference. This corresponds to the inner window test. Then positive and negative Δ values are applied to the adders in such a manner as to attempt to translate the n-dimensional PDW point into any one of the filter windows. This translation process models the outer window concept previously described but will require $2^n$ iterations for each parameter window to cover all the possible combinations, assuming that the modeled inner window is not less than half the width of the outer window in all dimension. For each translation of the PDW, the match list is compared with the reference list. The PDW is considered to reside between the inner and outer window of the associated filter for each match that is not found in the reference list. The previously described processor interrupt logic will, once again, still be required so that the filters can be grown appropriately.

The signal acquisition and collision detection aspects of the adaptive parameter channelizer described above eliminates many of the problems associated with excessive processing delays that occurred with previous target tracking systems. The automatic signal tracking capability of the adaptive parametric channelizer according to the present invention eliminates the loss of continuity in data collection experienced in previous implementations when signals move outside of pre-set windows. Moreover, the leading edge tracking process can be incorporated into the acquisition and collision algorithms without significantly affecting real time performance with that process providing greatly enhanced adaptability of the tracking algorithms as well as providing a more robust system performance.

This adaptive parameter channelizer use of a Match List Generator and associated techniques for dynamically mapping parameter filters to buffers provides more flexibility than previous tracking systems and simplifies the processing required to handle frequency agile emitters.

Additional features of the present adaptive parameter channelizer are the resource control functions, such as splits and external merges, which permit the tracking state of the Input Channelizer to be externally modified while effectively eliminating the need for programmers to be aware of precise details regarding placement of tracking filter windows and filter/buffer mappings. Furthermore, the distribution of functions between the Input Channelizer, the Resource Control Processor and client processors allows end-users to supply their own fine-grained deinterleaving algorithms for separating multiple signals which appear in a track channel.

Various modifications may be made to the preferred embodiments without departing from the spirit and scope of the invention as defined in the appended claims.

TABLE 1

Client Services Provided by the
Resource Control Processor

Access Services getStatus(ID): Indicates whether track channel ID is active, inactive or free.
getWindows(ID): Returns the windows of filters associated with track channel ID.
getCount(ID): Returns the number of pulses in track channel ID's buffer.
getBufferFullFlag(ID): Returns true if data in track channel ID's circular buffer has been overwritten since the last getDatao request.
getData(ID): Returns the data in track channel ID's buffer.

Tuning Services setWindow(IDrWindow): Use only one filter with parameter limits defined by Window for track channel ID.
trimLeft(ID, PRMTR, Value): For track channel ID, and for the parameter PRMTR in each filter window, perform the following:
   If PRMTRLo < Value, and PRMTRHi > Value, set PRMTRLo = Value.
   If PRMTRHi < Value, disconnect the filter.
trimRight(ID,PRMTR, Value): For track channel ID, and for the parameter PRMTR in each filter window, perform the following:
   If PRMTRHi > Value, and PRMTRLo < Value, set PRMTRHi = Value.
   If PRMTRLo > Value, disconnect the filter.
split(ID,PRMTR, Value): Split track channel with index ID into two track channels, dividing the channels along the cut line defined by Value in the PRMTR dimension of parameter space.
Merge(IDList, Window): Re-map all filters associated with channels specified in the IDList to a single new track buffer. If a value is associated with Window, then invoke setwindow on the new track channel.
remove(ID): The track buffer associated with track channel ID are returned to the free lists; references to track channel ID are removed from the merge history list; the ID number may be re-used.
terminate(ID): The filters associated with track channel ID are disabled and returned to the filter free list. The track buffer becomes inactive, but not returned to the buffer free list; the ID number may not be re-used.

Data Definitions

Window = (RFHi, RFLo, PWHi, PWLo, BRGHi, BRGLo)
  where RFHi(Lo) = Upper(Lower) RF (radio frequency) bound

TABLE 1-continued

Client Services Provided by the Resource Control Processor

PWHi(Lo) = Upper(Lower) PW (pulse width) bound
BRGHi(Lo) = Upper(Lower) BRG (bearing) bound
PRMTR = RF, PW or BRG
ID = track channel Index
IDList = list of IDs
Value = an integer value

---

The embodiments of the invention in which an exclusive property or privilege is claimed are defined as follows:

1. An adaptive parametric channelizer for acquiring and tracking discrete interleaved signals comprising at least one sensor for detecting signal data connected to an input channelizer which is under control of a resource control processor connected to the input channelizer wherein signal data detected by a sensor is converted to pulse descriptor words (PDWs) and applied to a FIFO buffer of the input channelizer with the FIFO buffer's output being applied to a set of parameter filter devices, the filters being provided with a range of parameter values by the resource control processor to which the filters are connected forming windows for a set of tracking filters to which signal data is applied in parallel from the FIFO buffer, one filter being designated as an acquisition filter that is initialized by the resource control processor with a parameter space that is equivalent to the dimensions of a viewport through which all signal data of interest will pass, the filters being connected to a match list generator having an output connected to a mapper and the resource control processor, operating such that when a signal's PDW falls within one of the filter's window, a match output for that filter is asserted and applied to the match list generator that maps asserted match inputs into a list of filter index numbers with that list being applied to the mapper and the resource control processor, the mapper transforming filter indices into track buffer indices in order to store a PDW associated with a match to one filter into an associated track buffer of a set of track buffers to which the mapper is connected, the combination of at least one parameter filter linked by the mapper with a track buffer forming a track channel.

2. An adaptive parametric channelizer as defined in claim 1, wherein the resource control processor is provided with an acquisition interrupt service and a collision interrupt service, an acquisition event being generated when a PDW falls only within the parameter space of the acquisition filter and a collision event being generated when two or more tracking filters match on a single PDW, these interrupt services having means to disable the FIFO buffer's data flow on the occurrence of one of the events, means to change the state of the parameter filter's windows in response to one of the acquisition/collision events and means to re-enable the FIFO buffer's data flow after a change of the state of the parameter filter's windows is completed.

3. An adaptive parametric channelizer as defined in claim 2, wherein the FIFO buffer, parameter filters, match list generator, mapper and track buffers are part of the input channelizer with outputs from the track buffers being connected by a local high speed data bus to analysis processors that produce processed data streams from the track buffer's data which are applied to a post-processor to which the analysis processors are connected.

4. An adaptive parametric channelizer as defined in claim 3, wherein the track buffers are circular with only the most recent data being kept when a buffer full condition occurs.

5. An adaptive parametric channelizer as defined in claim 2, wherein the acquisition interrupt service has means to obtain a new PDW from the channelizer hardware after the FIFO buffer is disabled on the occurrence of an acquisition event and means to set up a new parameter filter with a window having a predetermined default fixed radius in each of the parameter dimensions of said new PDW.

6. An adaptive parametric channelizer as defined in claim 5, wherein the resource control processor has means to map said new parameter filter to an existing acquisition track buffer by entering an appropriate buffer index into the mapper, means to obtain a new track buffer from a free list of track buffers and means to associate the new track buffer with the acquisition filter by the mapper so that a next acquisition PDW can be captured by the new track buffer.

7. An adaptive parametric channelizer as defined in claim 3, wherein the acquisition interrupt service has means to obtain a new PDW from the channelizer hardware after the FIFO buffer is disabled on the occurrence of an acquisition event, means to set up a new parameter filter with a window having a predetermined default fixed radius in each of the parameter dimensions of said new PDW with the resource control processor having means to map said new parameter filter to an existing acquisition track buffer by entering an appropriate buffer index into the mapper, means to obtain a new track buffer from a free list of track buffers, and means to associate the new track buffer with the acquisition filter by the mapper so that a next acquisition PDW can be captured by the new track buffer.

8. An adaptive parametric channelizer as defined in claim 7, wherein the resource control processor has means to inform both the analysis processors and post-processor of an acquisition event and to supply these with the index of a new track channel created by the new track buffer.

9. An adaptive parametric channelizer as defined in claim 2, wherein the match list generator has means to detect a collision event when a PDW falls into an overlap region of the parametric filters, means to provide a match list which is a list of filter index numbers that correspond to the filters that have matched that PDW, means to store that PDW in only the track buffer for the first filter index in the match list and means to invoke the collision interrupt service in the resource control processor.

10. An adaptive parametric channelizer as defined in claim 9, wherein the collision interrupt service includes means to select one of the parametric filters from the match list and expand that filter's parameter window to include the windows occupied by all other parametric filters in the match list and means to disable those other filters which are added to a filter free list.

11. An adaptive parametric channelizer as defined in claim 10, wherein means are provided to map said all other parametric filters to a new track buffer obtained from a track buffer free list when filters in the match list are mapped to a least two track buffers.

12. An adaptive parametric channelizer as defined in claim 11, wherein the resource control processor has means to append a data word referred to as a terminator to track buffers onto which filters in the match list are mapped and means to prepare a merge entry containing a list of track buffer indices that were involved in the collision event and an index of said new track buffer which are stored in a merge history list maintained in the resource control processor, the resource control processor having means to disable the FIFO buffer's data flow and the interrupt services while a merge entry is prepared in order to prevent an external merge request from being accepted during this procedure.

13. An adaptive parametric channelizer as defined in claim 2, wherein the sensors are receivers in a radar electronic support measures system which detect signal data transmitted by radar emitters.

14. An adaptive parametric channelizer as defined in claim 5, wherein the sensors are receivers in a radar electronic support measures system which detect signal data transmitted by radar emitters.

15. An adaptive parametric channelizer as defined in claim 5, wherein the match list generator has means to detect a collision event when a PDW falls into an overlap region of the parametric filters, means to provide a match list which is a list of filter index numbers that correspond to the filters that have matched that PDW, means to store that PDW in only the track buffer for the first filter index in the match list and means to invoke the collision interrupt service in the resource control processor.

16. An adaptive parametric channelizer as defined in claim 5, wherein the new parameter filter is set up with an inner parameter window centred on the new PDW with said predetermined default fixed radius in each of the parameter dimensions of said new PDW and a further filter is set up with an outer parameter window having parameters that are larger than the inner parameter window by a predetermined increment in each parameter dimension with any PDW having parameters entirely within said inner parameter window being stored in a track buffer associated with the new parameter filter and wherein any new PDW having parameters within a region between said inner parameter window and said outer parameter window invoking a leading edge tracking service having means to disable the FIFO buffer's data flow and said interrupt services in the resource control processor, means to adjust the parameters of the new parameter filter to a new inner parameter window centred on the parameters of the new PDW which invoked the leading edge tracking service, means to adjust the parameters of the further filter to a new outer parameter window which is larger than the new inner parameter window by said predetermined increment and means to re-enable said data flow and said interrupt services.

17. An adaptive parametric channelizer as defined in claim 6, wherein the new parameter filter is set up with an inner parameter window centred on the new PDW with said predetermined default fixed radius in each of the parameter dimensions of said new PDW and a further filter is set up with an outer parameter window having parameters that are larger than the inner parameter window by a predetermined increment in each parameter dimension with any PDW having parameters entirely within said inner parameter window being stored in a track buffer associated with the new parameter filter and wherein any new PDW having parameters within a region between said inner parameter window and said outer parameter window invoking a leading edge tracking service having means to disable the FIFO buffer's data flow and said interrupt services in the resource control processor, means to adjust the parameters of the new parameter filter to a new inner parameter window centred on the parameters of the new PDW which invoked the leading edge tracking service, means to adjust the parameters of the further filter to a new outer parameter window which is larger than the new inner parameter window by said predetermined increment and means to re-enable said data flow and said interrupt services.

* * * * *